Jan. 23, 1945.   W. S. SOUTHWICK   2,368,047
MACHINE FOR MAKING WELDED WIRE FABRIC
Filed June 13, 1942   10 Sheets-Sheet 1

Inventor:
WILLIAM SAYLES SOUTHWICK
by Edgar H. Kent
Attorney

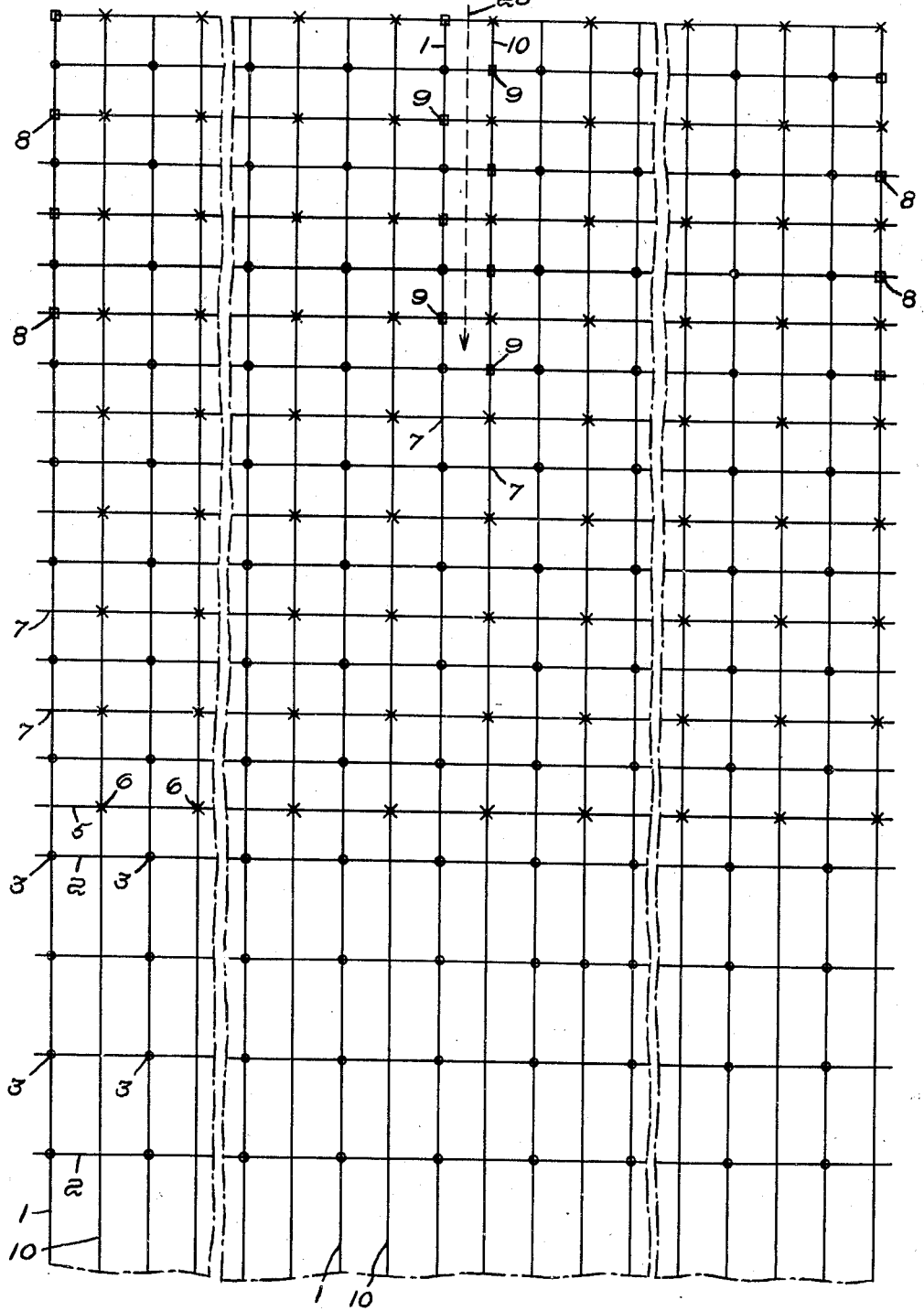

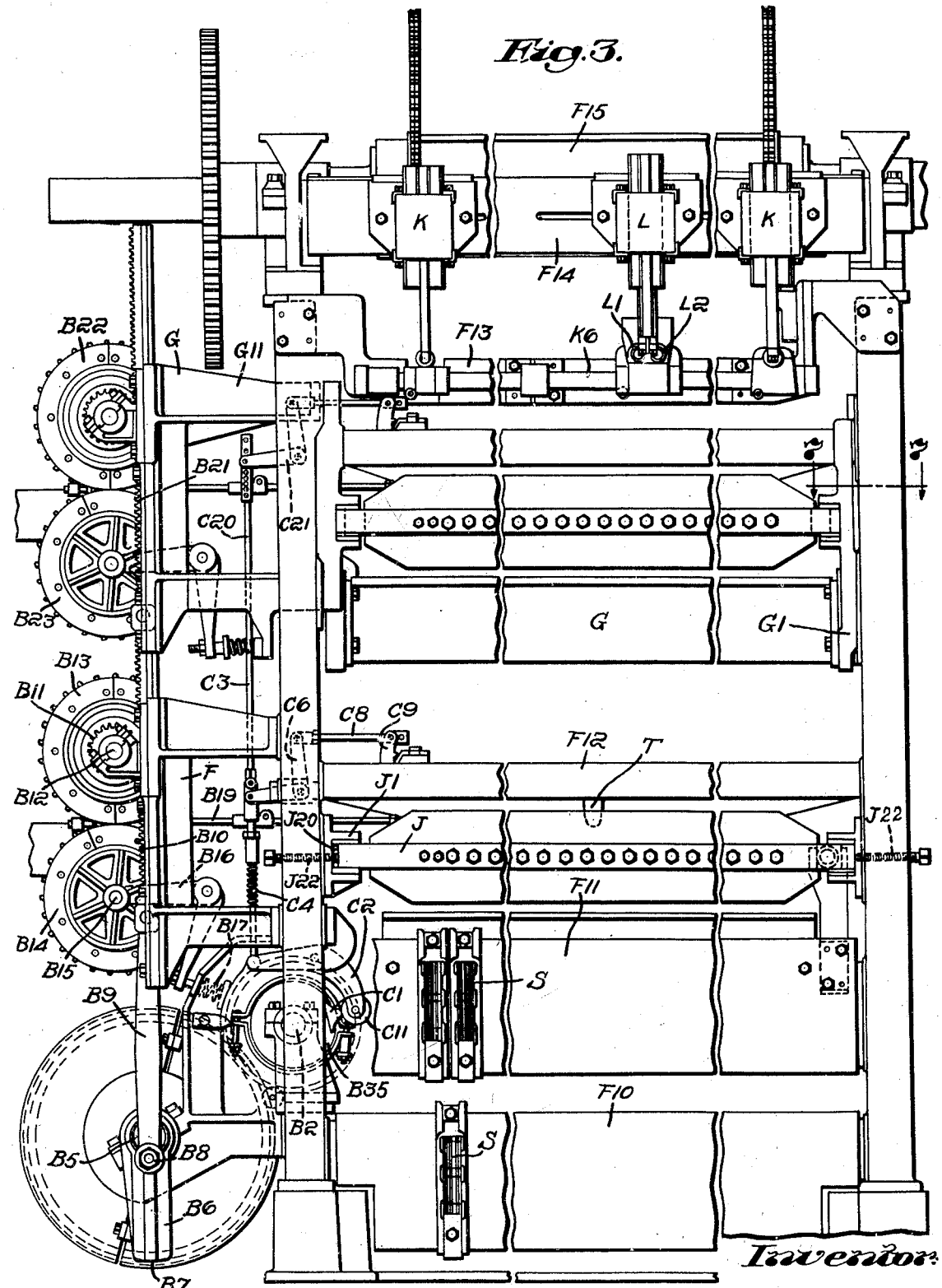

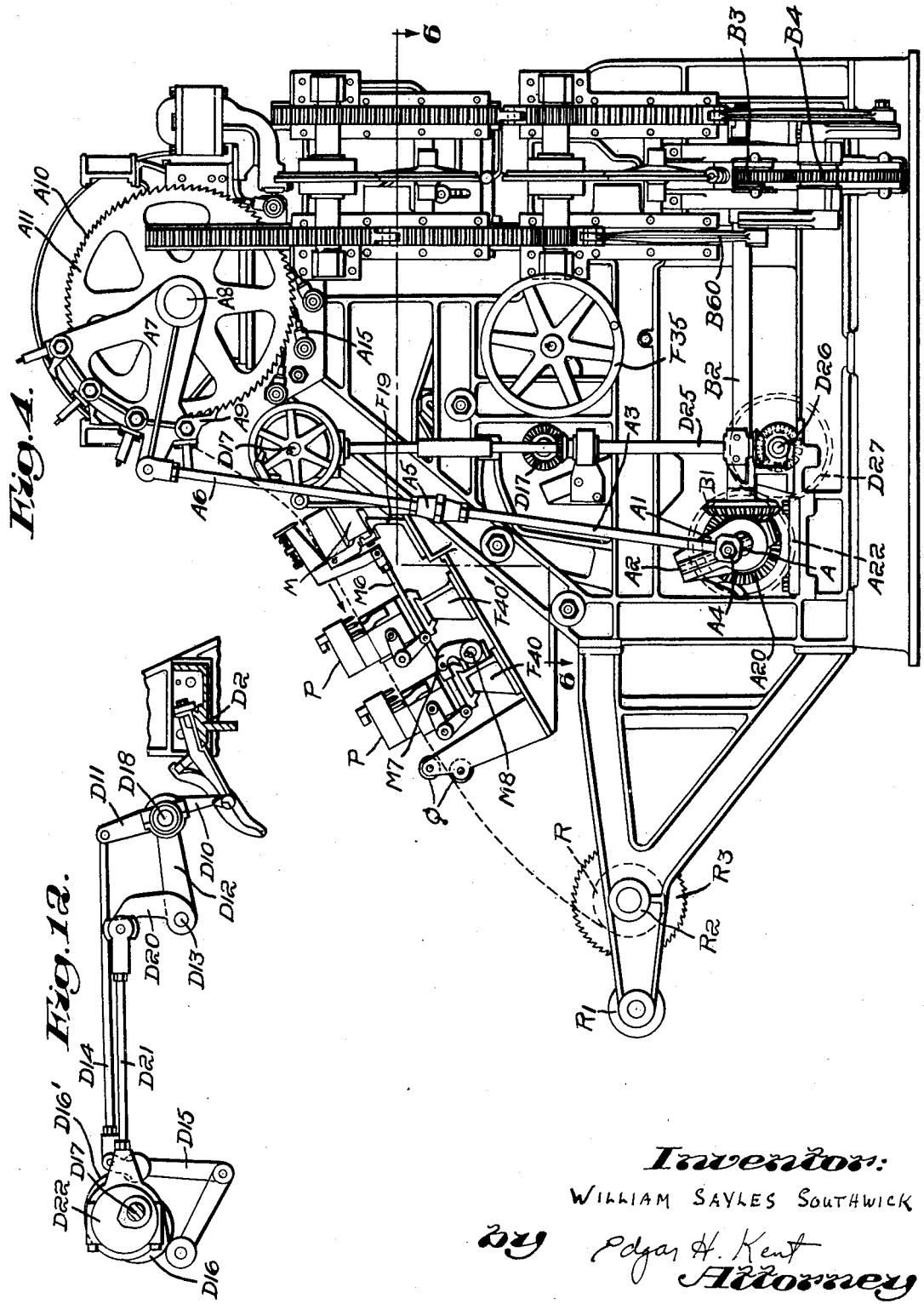

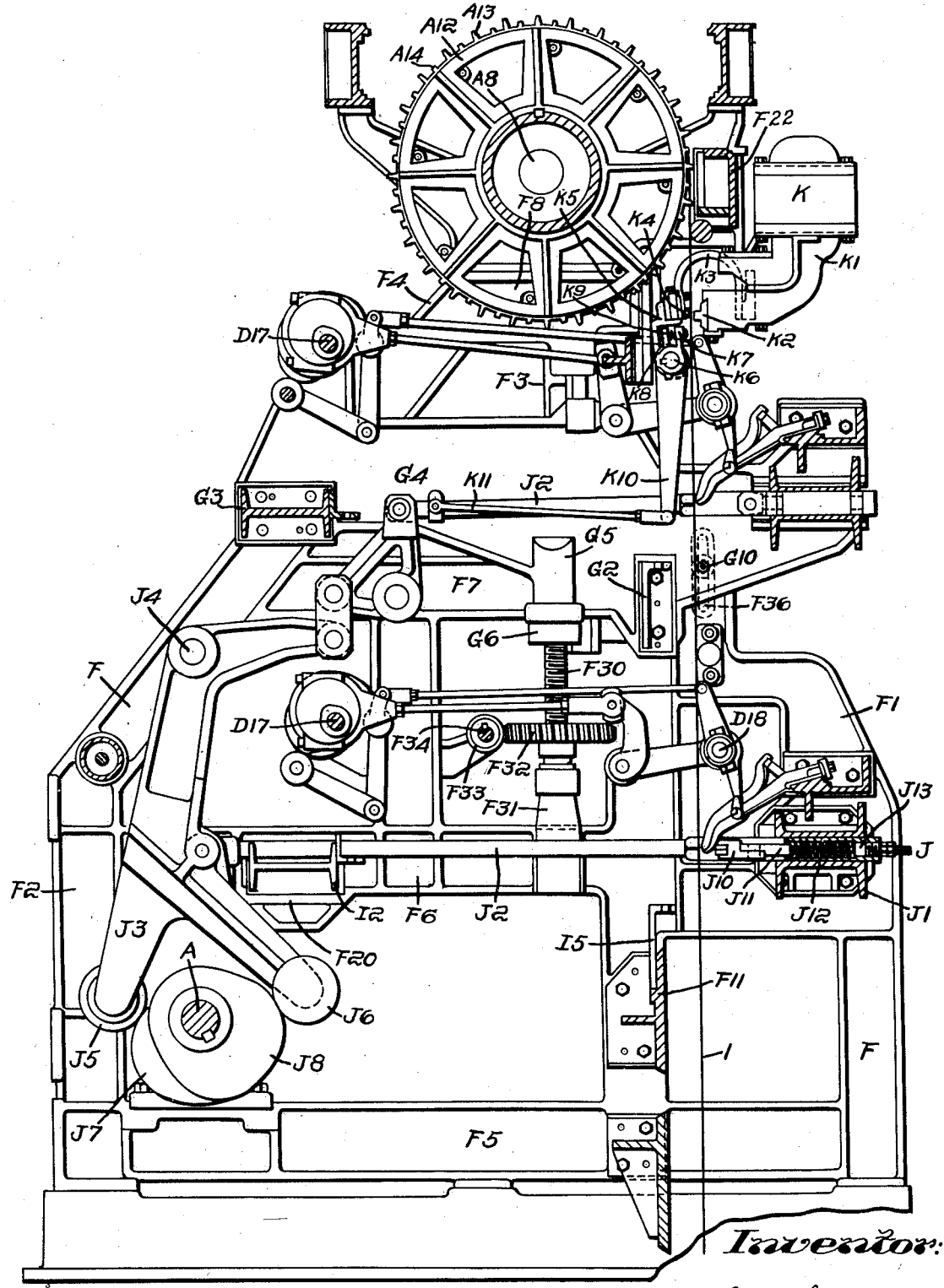

Jan. 23, 1945. W. S. SOUTHWICK 2,368,047
MACHINE FOR MAKING WELDED WIRE FABRIC
Filed June 13, 1942 10 Sheets-Sheet 6
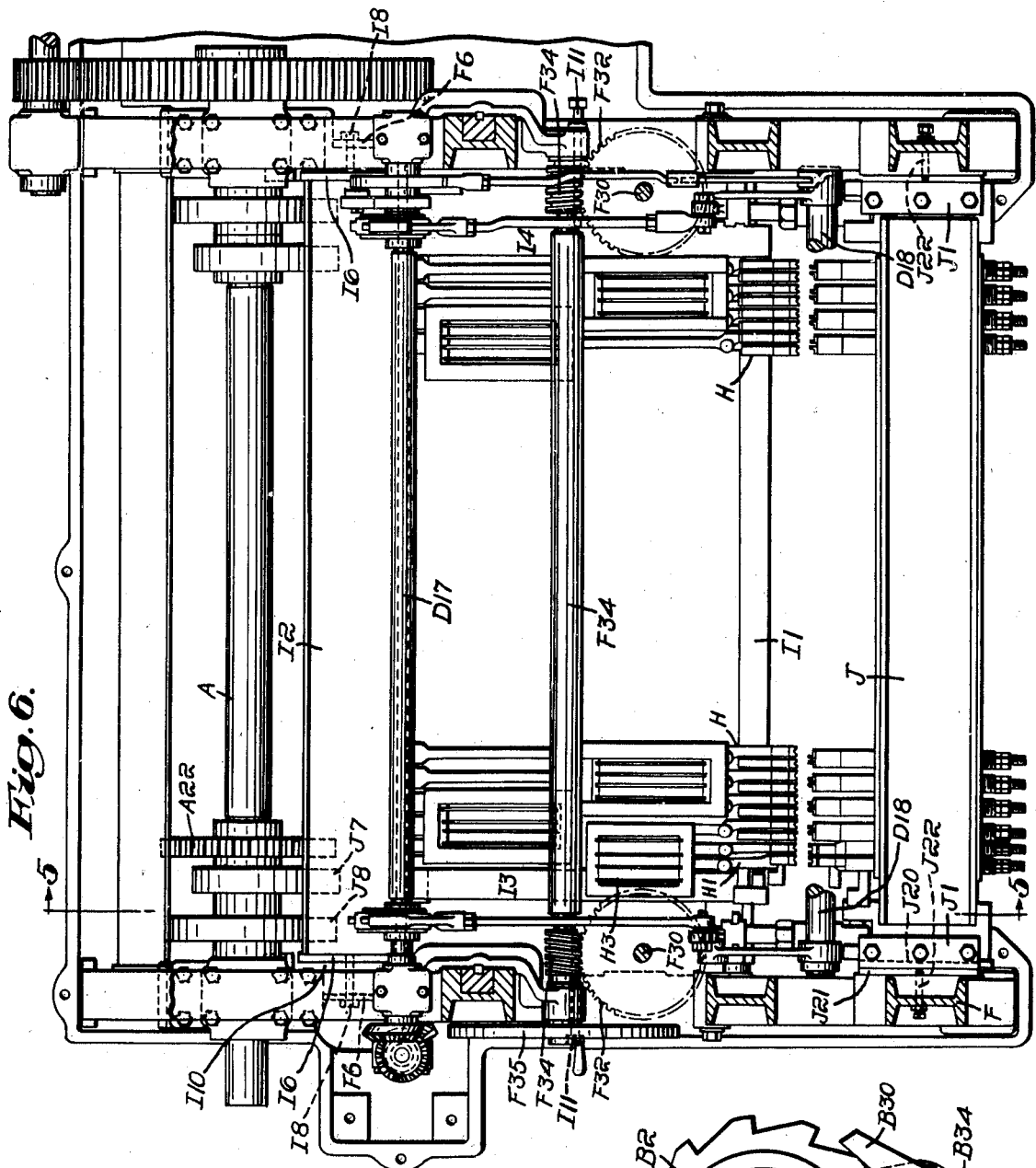
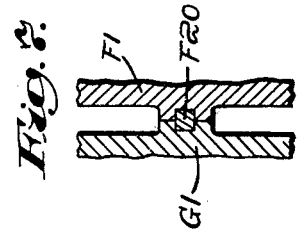
Inventor:
WILLIAM SAYLES SOUTHWICK
by Edgar H. Kent
Attorney

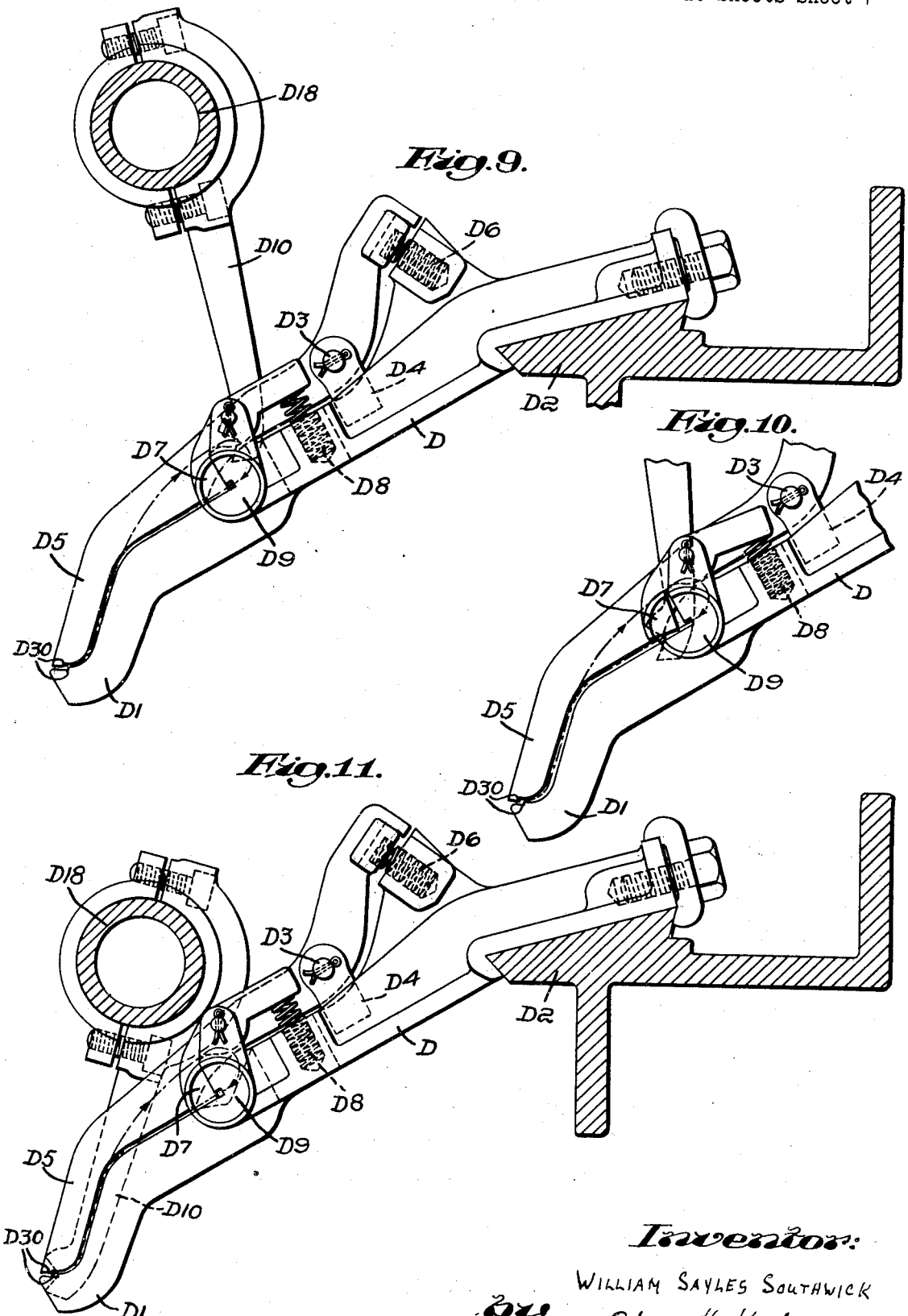

Jan. 23, 1945.   W. S. SOUTHWICK   2,368,047
MACHINE FOR MAKING WELDED WIRE FABRIC
Filed June 13, 1942   10 Sheets-Sheet 8
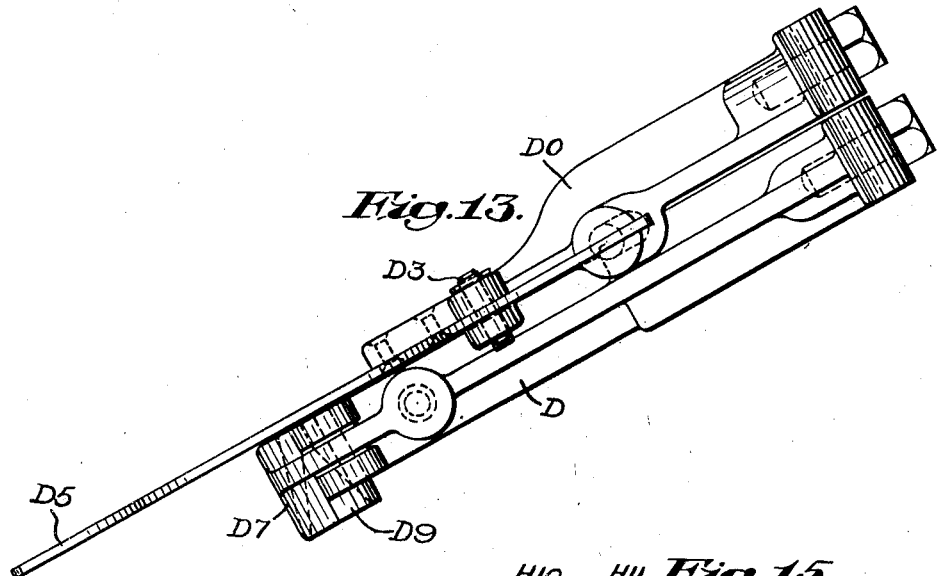
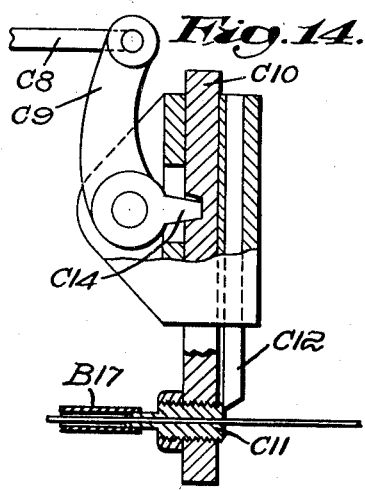
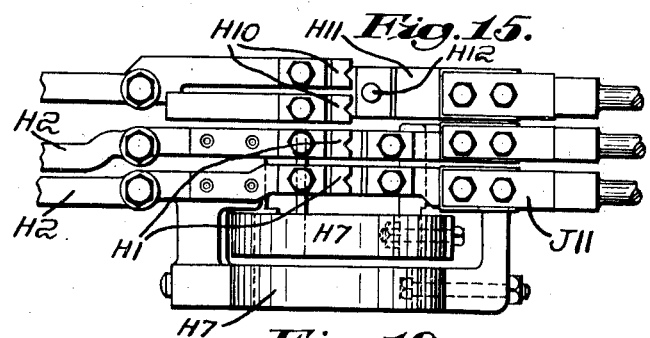
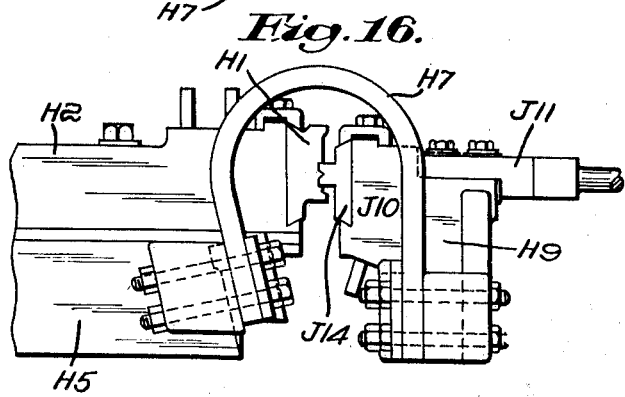
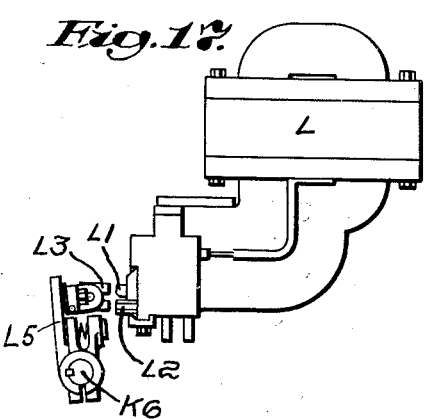
Inventor:
WILLIAM SAYLES SOUTHWICK
by Edgar H. Kent
Attorney

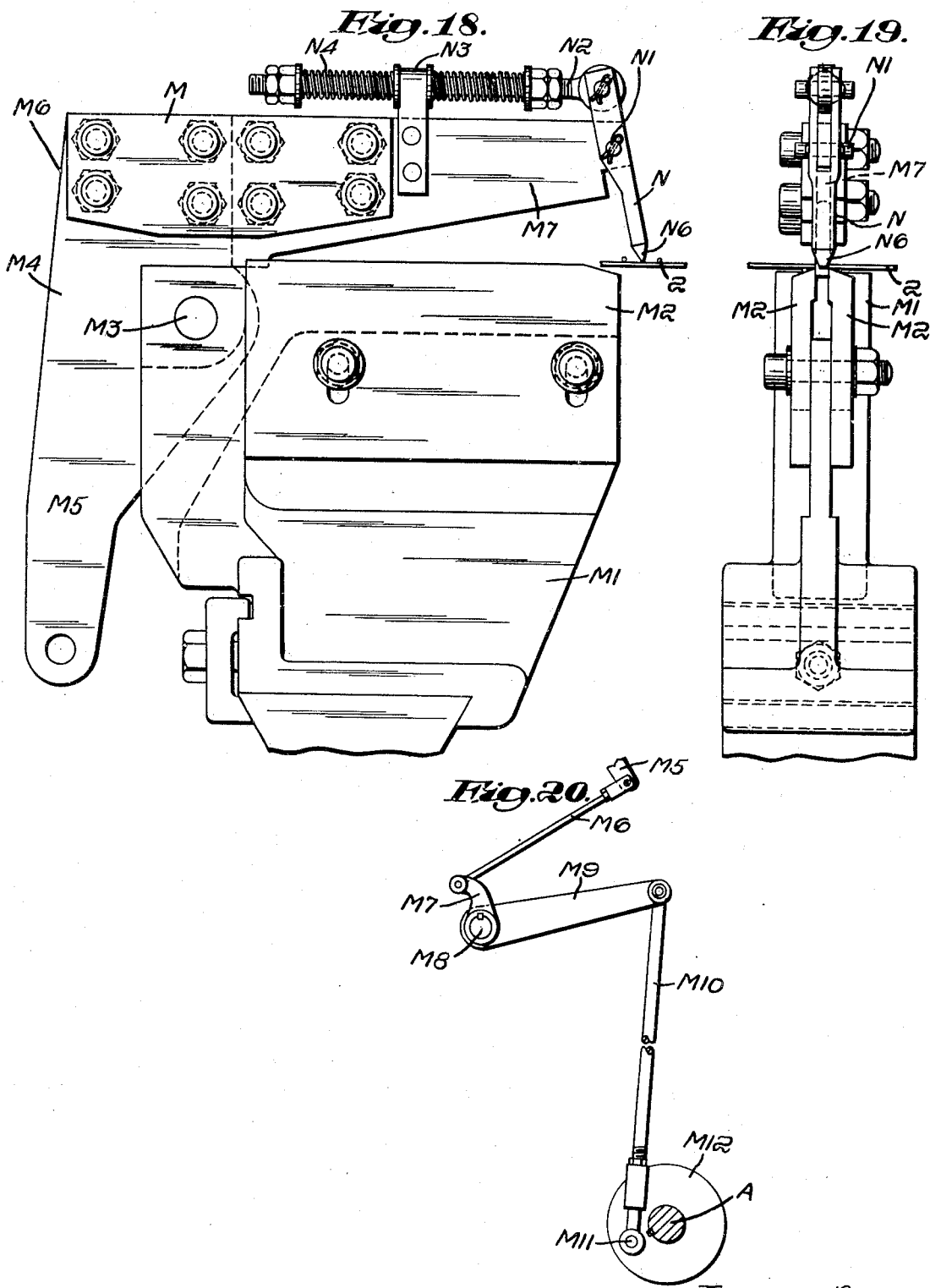

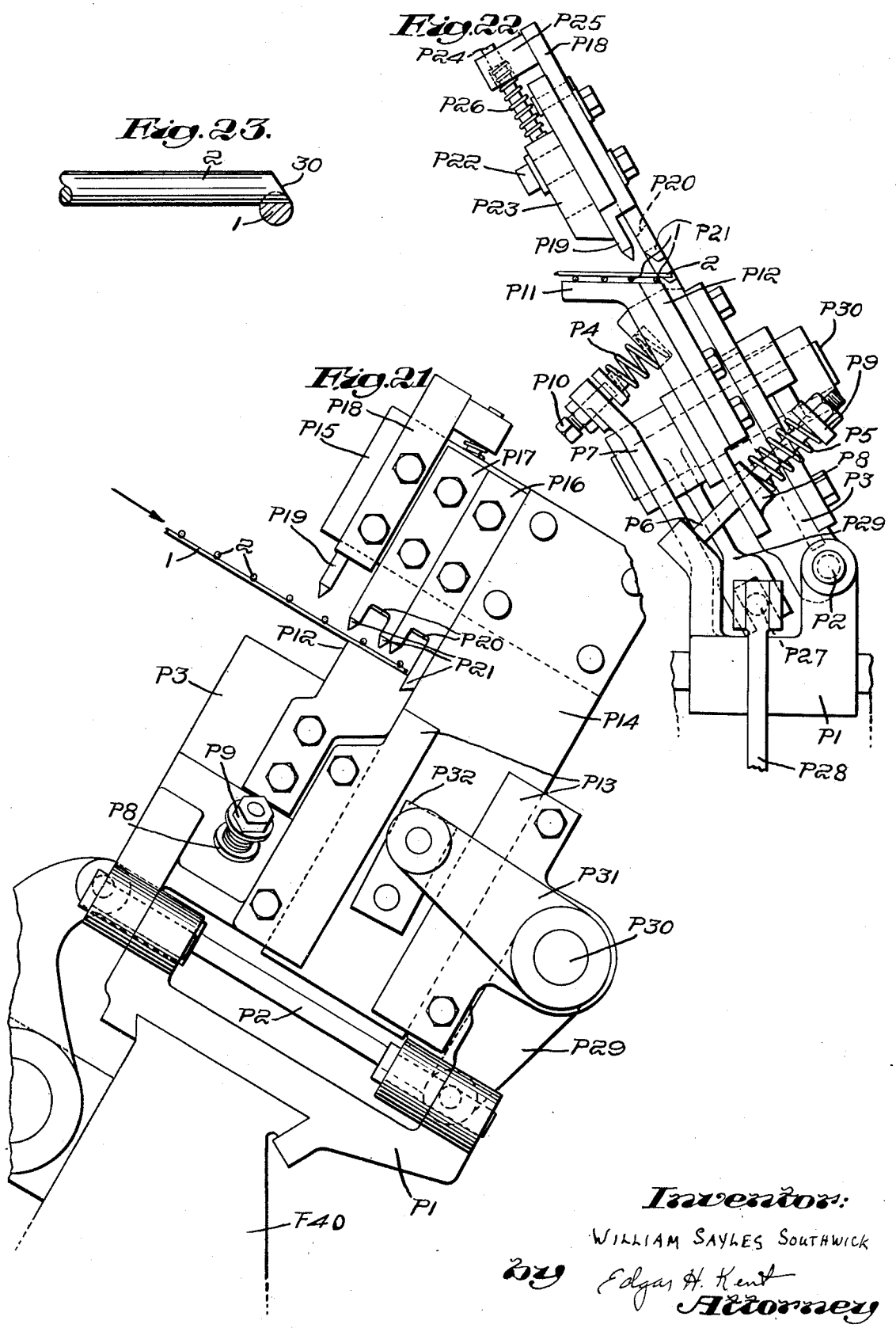

Patented Jan. 23, 1945

2,368,047

UNITED STATES PATENT OFFICE 2,368,047

MACHINE FOR MAKING WELDED WIRE FABRIC

William Sayles Southwick, East Lynn, Mass., assignor to Thomson-Gibb Electric Welding Company, Lynn, Mass., a corporation of Massachusetts Application June 13, 1942, Serial No. 446,948

17 Claims. (Cl. 140—112)

This invention relates to machines for making welded wire fabric.

An object of the invention is to provide a novel machine for this purpose with which two crossing or stay wires are fed across, and welded to, the longitudinally extending strand wires during dwells in the longitudinal movement of the strand wires in a time interval no longer than is required to feed and weld a single stay wire.

Another object is to provide such a machine in which the welding devices are adjustable to permit variation in the mesh size of the welded wire fabrics producible therewith, and to enable the production therewith optionally of different types of fabric in one of which each stay wire is welded to every strand wire and in another of which, between the edges thereof, each stay wire is welded only to alternative strand wires to which the next adjacent stay wire is not welded.

Another object is to provide, in such a machine, novel mechanism for splitting a single formed fabric longitudinally between its edges and novel means for smoothly trimming the edges of the fabric.

The foregoing and other objects and advantages of the invention will be more fully apparent from the ensuing particular description of the invention, in conjunction with the appended drawings, illustrative of preferred embodiments, wherein:

Fig. 2 represents another sort of welded fabric produced by the machine;

Fig. 3 is a front elevation view of a machine of the invention with some parts omitted and others broken away;

Fig. 4 is a side view of the machine shown in Fig. 3;

Fig. 5 is a vertical section on the line 5, 5 of Fig. 6 with parts omitted;

Fig. 6 is a partial plan section view on the line 6, 6 of Fig. 4, with parts omitted;

Fig. 7 is a section on the line 7, 7 of Fig. 3;

Fig. 8 is a detail of parts of the intermittent feed mechanism;

Figs. 9, 10 and 11 are details of a wire carrier and transfer mechanism;

Figure 1:
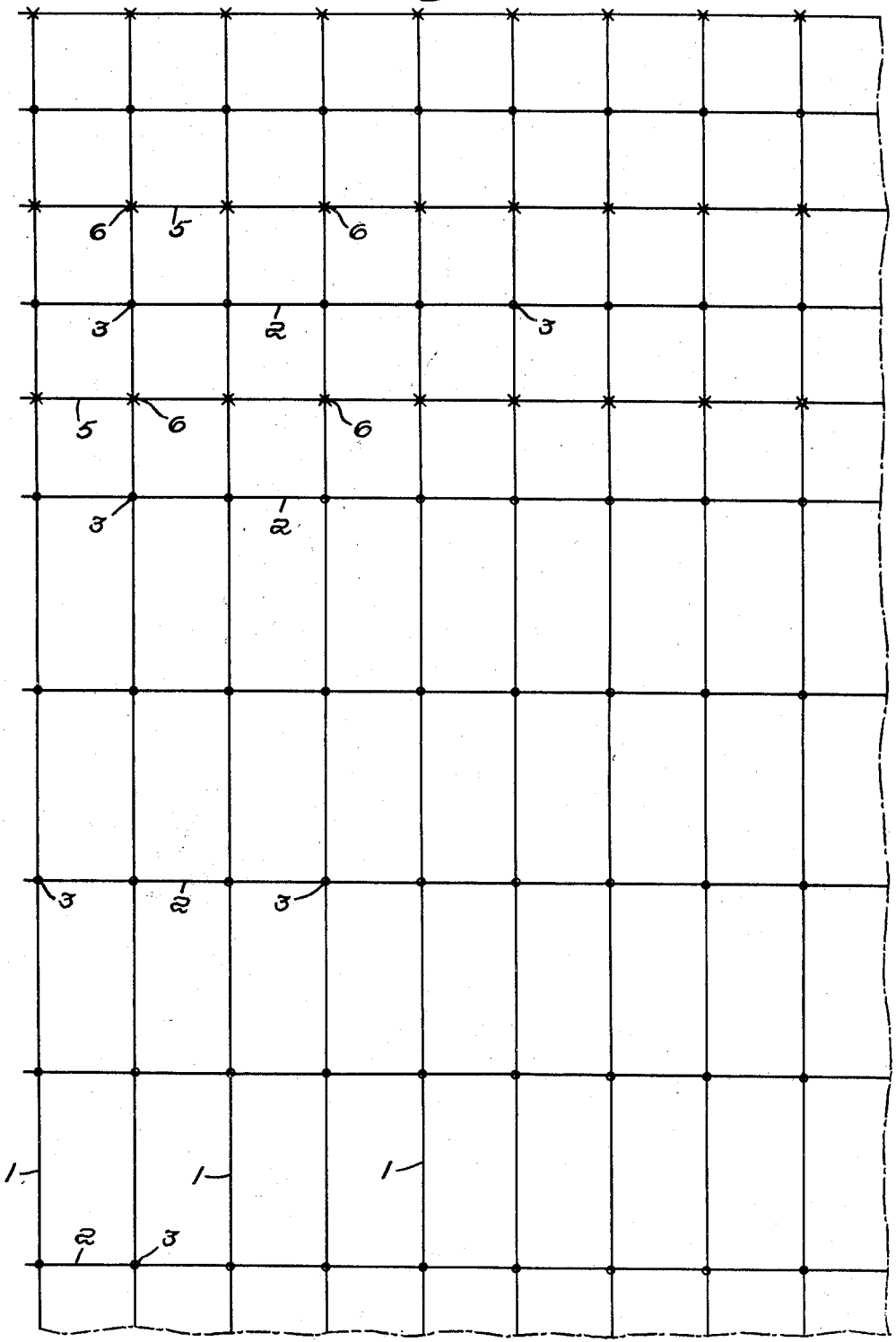
Fig. 1 represents one sort of welded wire fabric produced by the machine.

Fig. 12, sheet 4, is a detail of the mechanism which operates the wire transfer mechanism.

Fig. 13 is a plan view of a wire holder;

Fig. 14 is a detail of the cutter mechanism;

Fig. 15 is a plan view of the electrodes adjacent one edge of the fabric;

Fig. 16 is a side elevation of the electrodes of Fig. 15;

Fig. 17 is a side view in detail of the welding device for welding intermediate crossings in a fabric which is subsequently split longitudinally;

Fig. 18 is a side elevation of the fabric splitter;

Fig. 19 is an end view of the splitter shown in Fig. 18;

Fig. 20 is a detail of the splitter operating connections;

Fig. 21 is a side view of an edge trimmer, taken from the right hand side of the machine;

Fig. 22 is an end view of the trimmer shown in Fig. 21;

Fig. 23 is a detail, on an enlarged scale, of an edge strand wire and a trimmed end of a stay wire.

The machine embodies groups of mechanisms which operate as follows:

The strand wires 1 are fed into the machine at its lower front end, Fig. 5 and, after being straightened by the usual straightening devices S, Fig. 3, they pass upwards in parallel relation at the front of the machine. They are drawn upward intermittently by the rotation of feed wheels A12, Fig. 5, at the top of the machine. The feed wheels have grooves in which the strand wires of the welded fabric lie. These wheels are rotated intermittently to feed the fabric and the strand wires a distance equal to twice the distance separating successive stay wires in the welded fabric. Between each intermittent motion the fabric and the strand wires dwell while the stay wires are welded to the strand wires. Two stay wires are fed in at the same time, one above the other, across the front of the machine and in front of the parallel strand wires. Each stay wire is cut off and the length of wire cut off is carried from the position in which it is left by the feeding mechanism to a position in which it lies close to the series of strand wires. During the dwell of the strand wires the stay wires are pressed against and are electrically welded to the strand wires. After the welding is completed, the welded fabric and the strand wires are advanced to their next position in which they dwell while two more stay wires are electrically welded to the strand wires.

Several sorts of welded wire fabric are made by this machine.

It may be assumed, for example, that the electrodes are approximately one inch apart in both the lower and upper banks of welding devices.

In one product, Fig. 1, representing a one-inch square mesh, the strand wires 1 are correspondingly spaced one inch apart. The stay wires 2, composed of a first set to be welded, are fed in to be welded at the lower bank of electrodes and may be two inches apart and are welded to the strand wires at every point of crossing 3. The stay wires 5, composed of a second set to be welded, are fed in to be welded at the upper bank of electrodes and are welded to each strand wire at points 6 which are half way between the first set of stay wires 2 previously welded at the lower bank of electrodes. The result is a fabric composed of strand wires and stay wires of one inch mesh, for example, the wires being welded together at every point of crossing.

A second sort of fabric, Fig. 2, which can be made by the machine, is composed of strand wires 1 and 10, one-half inch apart, and stay wires 2 and 5, also one-half inch apart. In this case each stay wire is welded to the strand wires at every other point 3, 3 and 6, 6 where it crosses a strand wire. The stay wires 5 of the second set, which are fed in and welded at the upper bank of electrodes, are welded only to the strand wires 10 to which the stay wires 2 are not welded. This produces a welded fabric in which there are substantially as many unwelded crossings as there are welded crossings, leaving every other crossing 7 unwelded on the edge of the fabric. These crossings are welded at 8 by electrodes in a third bank above the second bank, so that the final fabric is welded at every crossing on each edge and at every other crossing between the edges. I have found that the welded fabric so produced is entirely satisfactory and advantageous for many purposes.

A fabric of such fine mesh as one-half inch with all crossings welded can also be made in the machine, but at a reduced rate. In making such fabric, stay wires are fed in only at the lower bank, the strand wires are advanced a distance equal to the mesh desired and are welded only to alternate strand wires by the electrodes of the lower bank. When the stay wires reach the electrodes of the upper bank they are thereby welded to the alternate strand wires to which they were not welded by the electrodes of the lower bank, the sets of electrodes of the two banks being operated simultaneously during each dwell of the strand wires.

Sometimes it is desirable to split the fabric into two parts, that is, to produce two comparatively narrow welded fabrics at the same time. The fabric is split, after having been welded, by a splitter at the rear of the machine which cuts the stay wires at points indicated, for example, by the dotted line 20, Fig. 2, between two adjacent strand wires 1 and 10.

In the case of the split fabric of the second sort above described, the unwelded crossings 7, 7 adjacent to the line 20, on which the fabric is to be cut, are welded at 9 by electrodes in the third bank located above the second bank. In such case I make two welds at once and for this purpose the electrodes of a pair are spaced apart one-half inch both vertically and horizontally. The welds at 8 and 9 are welded during the same dwell of the fabric. Thus, the split fabric of one-half inch mesh has all the crossings on both edges welded and substantially every other crossing between the edges welded.

After the fabric is welded, trimmers cut off the projecting ends of the stay wires which extend beyond the edge strand wires with a beveled cut, providing a smooth side edge in the fabric.

In order to feed in and weld two stay wires as above described, the machine is provided with a vertically adjustable frame G mounted on the main frame F.

Referring to Figs. 3 and 5 a main frame F has on each side of the machine uprights F1 and F2 with respectively upper portions F3 and F4. These parts are connected together by members F5, F6, F7 and F8, Fig. 5, and the cross girts F10, F11, F12, F13, F14 and F15, Fig. 3.

Referring to Fig. 3, each upright F1 and F2 is provided with a vertical key F20 shown in cross-section in Fig. 7. On each key slides a side member G1 of the frame G which carries the mechanism for feeding in the upper feed wire, cutting it, transferring it into welding position and electrically welding it to the strand wires. This frame G has a cross girt G2, Fig. 5, near the front of the machine and a cross girt G3 at the rear of the machine. At each side of the machine is a web G4 fastened to the girts G2 and G3. On each web G4 is a boss G5 to the bottom of which is fastened a nut G6 provided with internal threads into which projects screw F30. The boss G5 has a clearance hole to permit the screw F30 to extend up into it. By turning the screw F30, as will be described, the entire frame G may be raised or lowered and held in adjusted position.

Each of the screws F30 is mounted to be turned in a bearing F31, fastened to the main frame F. A worm wheel F32 is fixed on the shaft of screw F30. A worm F33 engages with the worm wheel F32 and is fast on a shaft F34 mounted in suitable bearings on the main frame. The shaft F34 extends to one side of the machine where there is affixed to it a hand wheel F35, Fig. 4, by which the shaft F34 may be turned, operating the two screws F30, to raise or lower the frame G.

The main frame, Fig. 5, has, at each side, a slot F36 through which projects a screw G10 entering a threaded hole in the frame G. By setting up this screw the frames F and G can be bolted together in adjusted relative position.

The means for intermittently advancing the welded fabric and the unwelded strand wires are as follows: a suitably driven shaft A, Fig. 4, extends across the machine near its base. This shaft has secured to it at its left-hand end a crank arm A1 in which there is a T slot A2. The lower end of a rod A3 is pivoted to a bolt A4 which is adjustably secured by a bushing in the slot. The rod A3 is adjustably secured by a turnbuckle A5 to a rod A6 which is pivoted to a segment A7 loose on a shaft A8. The segment has pivoted to it pawls A9 which are spring pressed so as to engage the teeth A10 of a ratchet wheel A11 fast on shaft A8.

Secured to a drum keyed to the shaft A8 are a number of wheels A12 having teeth A13, Fig. 5. These teeth project into the meshes of the woven fabric to pull that fabric along as the wheels are rotated intermittently by the mechanism above described. During the upward movement of the rod A6 the segment A7 is in its backward movement and the shaft A8 is held stationary by spring pressed pawls A15, Fig. 4, pivoted on the frame of the machine so that the woven fabric and the strand wires dwell while the stay wires are electrically welded to the latter, as will be described. The wheels A12 are provided also with short stubs A14, Fig. 5, which serve to guide and support the woven fabric.

The mechanism for feeding in the lower stay wire is as follows: on the shaft A, Fig. 4, is a bevel gear A20, which meshes with a bevel gear B1 on a shaft B2, on the other end of which is loosely mounted a spur gear B3. The gear B3 drives a gear wheel B4 fast on the short shaft B5, Fig. 3.

On the shaft B2, Fig. 8, is fixed an arm B34 on which is pivoted a pawl B30, one end of which is pressed by a spring B31 into engagement with a ratchet wheel B32 fast on the hub of the spur gear B3. The rotation of the shaft B2 and arm B34 with pawl B30 drives the spur gear B3, except when the tail of pawl B30 comes in contact with a roller B33 on a pin on the frame, whereby the active end of the pawl is moved out of engagement with the ratchet B32 which dwells until the tail of pawl B30 passes beyond roller B33, when the pawl again is caused to engage the ratchet by the spring B31. During this dwell, which occurs at the end of the feeding in of a stay wire, the wire is cut and carried towards welding position, as will be described.

Fixed to the outer end of shaft B5, Fig. 3, is a crank B6 having a slot B7 in which is adjustably secured a bolt B8 on which is pivoted, through a bushing, the lower end of a rod B9, the upper end of which is pivoted to the lower end of a rack bar B10 sliding in guides in the frame F. The rack bar extends upwards and near its upper end it is connected to an upper rack B21 sliding in guides in the frame G.

The lower rack B10 meshes with a spur gear B11 loose on a shaft B12. The spur gear B11 is provided with a one-way clutch so that, as the rack B10 rises, it turns the gear B11 anticlockwise, as shown in Fig. 3, and gear B11, being then clutched to the shaft B12, turns the wheel B13 fast on that shaft. The wheel B13 has teeth thereon which mesh with the teeth on a wheel B14 mounted on a shaft B15. The shaft B15 is mounted in journals on the end of one arm of a bell crank lever B16 pivoted on a pin secured to the frame F. The other end of the lever is pressed by a spring B17 acting through a bolt, threaded into it, so as to press the wheel B14 upward to grip the stay wire between the wheels B13 and B14. The wheels B13 and B14 therefore move, when the rack B10 rises, in a direction to feed a stay wire, gripped between them, into a tube B19 and a set of receivers which are located in front of the row of parallel strand wires. When the rack B10 descends, it rotates the gear B11 in the opposite direction, but, as at this time that gear is unclutched from the shaft B12, it does not turn the wheels B13 and B14.

On the inner end of shaft B5 is fixed another crank B60, Fig. 4, which operates the wheels B13 and B14 by a duplicate of the mechanism just described. The result is that for each one-half rotation of the shaft B5 these wheels feed a stay wire of the first set into the machine.

The wheels B22 and B23, which feed in the stay wires of the upper or second set, are carried on a bracket G11, Fig. 3, fastened by bolts to the movable frame G. They are rotated in unison with the lower wheels B13 and B14 by the rack bars and mechanism, carried on frame G, which are duplicates of the devices above described, carried on frame F, which rotate with wheels B13 and B14.

These pairs of wheels B13, B14 and B22, B23 feed the two stay wires into the machine simultaneously. Each stay wire is taken from a coil from which it unwinds as it is fed into the machine.

Each stay wire, after being fed into the machine, is cut off by a wire cutting mechanism, one such mechanism being mounted on frame F and another on frame G. As they are duplicates, it will suffice to describe that on frame F.

A cam C1, Fig. 3, on the disk B35 fast on the shaft B2 lifts a roller C11 on one end of a bell crank lever C2 pivoted to a bracket on the frame. A rod C3, pivoted at its lower end to the other end of lever C2, is pulled down when cam C1 rocks the lever C2. Pivoted to the rod C3 is a bell crank lever C6 pivoted on a bracket on the frame. The upright arm of lever C6 operates a link C8 to rock a lever C9, Fig. 14, pivoted to a bracket on the frame.

The other arm C14 of lever C9 moves a slide C10 in guides on a bracket on the frame. The slide carries at its lower end a movable cutter C11 having a central hole through which the stay wire 2 passes. The stay wire passes just beneath a stationary cutter C12 adjustably secured to the bracket. Thus, when the cutter C11 is lifted by the mechanism above described, it lifts the wire against the stationary cutter C12 and cuts it off.

The upper stay wire 5 is cut off in the same way by a duplicate of the mechanisms just described operated by a rod C20, Fig. 3, to which the bell crank lever C21 is adjustably secured. The rod C3 is returned to inoperative position, when permitted by the cam C1, by spring C4 acting between a bracket on the frame and a sleeve and nut on the rod C3.

Each stay wire is fed into a set of receivers. As the receivers are all alike for both the lower and upper stay wires, it will suffice to describe a receiver best shown in Figs. 9, 10, 11 and 13. The receiver head is a part of a casting D. It has a cone-shaped mouth D9 into which the wire is fed. The casting D is mounted adjustably on a cross bar D2 of the frame. On the casting D is pivoted a latch D7, the lower end of which engages the stay wire when it is in the receiver and the opposite end of which is pressed upward to hold the wire by a spring D8.

A casting D0 (Fig. 13) is also mounted adjustably on the cross bar D2 of the frame. Secured to this casting is a guide arm D1. Pivoted at D3 on a lug D4 on the casting D is an upper guide in the form of a lever D5, the inner end of which is pressed towards the guide D1 by a spring D6.

The stay wire having been fed into the machine and cut, the parts are in the position shown in Fig. 9. Then the fingers D10 are so moved that their lower notched ends engage the stay wire and move it bodily rearwardly and downwardly through the slot between the guides D1 and D5 to the position shown in Fig. 11. In so doing the stay wire lifts the latch D7, as shown in Fig. 10.

To carry the stay wire from the receivers to welding position there are a number of fingers D10 fast on a hollow shaft D18.

The means for operating the fingers D10 are shown in Figs. 5 and 12. The shaft D18 is carried in the ends of arms of bell crank levers D12 pivoted on stud D13 on the frame. The arm D11 is fast on shaft D18 and to its end is pivoted a rod D14, the other end of which is pivoted to a bell crank lever D15 pivoted on a stud on the frame. The lever D15 is moved by cams D16 and D16' on a shaft D17 rotatably mounted in bearings on the frame. This mechanism moves the lower ends of fingers D10 more or less horizontally. To give the lower ends of fingers D10 a compound movement, arm D20 of bell crank lever D12 is pivotally connected to a rod D21 fast on the strap of an eccentric D22 on the shaft D17. By these mechanisms the lower ends of fingers D10 are so moved as to carry a stay wire down through the slot between the guides D1 and D5 to hold it close to the parallel vertical strand wires. As the fingers D10 begin their wire-carrying movement, they force the wire to open latches D7 against the stress of springs D8, Fig. 10. When the fingers carry the wire to the end of the slot, the wire is held by notches D30 in the ends of the guides D1 and D5 until it is picked up by the movable electrodes and carried by them against the strand wires.

A duplicate of the foregoing described mechanism is arranged to carry at the same time and in the same way the upper stay wire, which has been fed into the machine and cut off, close to the parallel vertical strand wires.

The shafts D17 are operated by bevel gears from a vertical shaft D25, Fig. 4, which is operated by bevel gears from a shaft D26. Shaft D26 is rotated by a gear wheel D27 which meshes with a gear wheel A22 on the main shaft A.

Each stay wire is welded to all the strand wires simultaneously. As the sets of welding devices for welding the upper and lower stay wires are the same, it will suffice to describe the lower set.

For each stay wire there is a row of stationary electrodes H, Fig. 6. In the case of each of the two outside electrodes on one side of the machine a stationary electrode H1, Fig. 16, is connected by a suitable conductor H2 to the secondary of a transformer H3, Fig. 6. The other secondary conductor from this transformer is connected to a bar H5, Fig. 16, which is separated from H2 and is connected by a flexible conductor H7 to the corresponding movable electrode holder H9. The welding current flows from the electrode H1 through the wires to be welded at their crossing, to the movable electrode holder H9, and thence through H7 to H5, the other terminal of the secondary of the transformer.

The other stationary electrodes H10 are arranged in pairs so that the current flows from one terminal of the secondary through one electrode, through the crossed wires, and into a movable conductor H11, which rocks on a pin H12, thence through the next adjacent crossing of the wires to be welded and thence to the other stationary electrode H10 which is connected to the other terminal of the secondary.

There is one transformer, mounted on the frame, for each welding current.

By this arrangement of the electrodes, the machine is adapted to weld wire fabrics of different widths. When the two outside electrodes H1 are used, there will be an even number of welds and the woven fabric will therefore be an odd number of inches wide, assuming the strand wires are one inch apart. When the outside electrode is not used, there will be an odd number of welds and the fabric will be an even number of inches wide. If a narrower fabric is to be welded, pairs of electrodes beginning on the other side of the machine may be disconnected.

The movable electrodes are mounted on a movable frame J, Figs. 5 and 6, which is adapted to slide forwards and backwards in the machine in guideways J1, Fig. 6. The means for moving the frame consist of rods J2, one at each side of the machine, Fig. 5. A rod J2, at its rear end, is hinged to a lever J3 which is pivoted to the frame F at J4. The lower end of the lever J3 is forked and at each of the forks are respectively rollers J5 and J6 which are operated by cams J7 and J8 on shaft A. Mounted to slide in guide ways in the frame J are a series of electrode holders J10 each having a plunger J11 surrounded by a spring J12 which bears against an adjustable nut J13 fixed in the frame J. The movable electrode consists of a block J14, Fig. 16, having beveled jaws adapted to engage a strand wire. The block J14 is insulated from the plunger J11. When the frame J is operated to carry the movable electrodes towards the rear of the machine, the beveled jaws of the blocks J14 pick the stay wires from the notches in the ends of the guides D1 and D5, Fig. 11, and press the wires against the vertical strand wires yieldingly by the springs J12, Fig. 5. After the welds have been completed, the movable electrodes are moved forward into inoperative position by the movement of the frame J.

The electrodes, both stationary and movable, on the frame G for making the welds between the upper stay wire and the strand wires are operated by a second set of mechanism having substantially the same construction and mode of operation as the mechanism for operating the lower set of electrodes.

By these means two stay wires are simultaneously welded to the strand wires.

The movable lower frame J and the frame I carrying the transformers H3 for the lower set of electrodes are each adjustable transversely of the machine by a distance equal to one-half of the distance between adjacent electrodes; that would be one-half an inch if the electrodes were one inch apart. The purpose is to make the fabric shown in Fig. 2 in which the strand wires are separated by one-half the distance between electrodes of each set. Thus alternate strand wires 1, 1 are welded by the electrodes in the lower bank, as above described, and the other set of alternate strand wires 10, 10 are welded by the upper bank of electrodes carried on frame G.

The frame J is capable of a limited transverse movement in the guides J1. As shown in Figs. 3 and 6, a spacer piece J20 is set in between the left-hand end of the frame J and the side J21 of the guide J1. As the width of the spacer piece is equal to one-half the distance between adjacent electrodes, the spacer piece positions the frame J that distance to the right, for example, thereby enabling the lower electrodes to weld the strand wires which are between the strand wires welded by the upper bank of electrodes. A set screw J22, tapped into the frame F, is set up to hold the spacer piece. There is another set screw J22 on the other side of the frame. When the frame J is positioned to the left, the spacer piece J20 is removed from the left and inserted at the right hand end of the frame J.

A frame I carries the lower bank of transformers. It is composed of the cross members I1 and I2 and side members I3 and I4, Fig. 6. This frame is mounted so as to be adjusted to the right or left so as to register the transformer electrodes with the movable electrodes of the lower bank which are adjustable sidewise as just described.

The front frame member I1 has a depending plate I5, which is mounted to slide in a recess in the lower transverse main frame member F11, Fig. 5. The rear frame member I2 has fastened to it at each end a plate I6 which rests on a plate F20, Fig. 5, on the main frame member F6. At each side there is a bolt I8, Fig. 6, tapped into the plate I6 and passing through a clearance hole in the frame F6. As shown in Fig. 6, the bolt I8 at the left is set up so that the frame I is at the right, and the bolt I8 at the right is backed off. A space I10 is left between the end plate I6 and the side of the frame F6. Also at each side is a bolt I11 adjustably threaded through the main frame and bearing against the side members I3 and I4 respectively. As shown in Fig. 6, the bolt I11 at the left is set up and the bolt I11 at the right is backed off so that frame I is at the right. This adjustment of frame I to the right corresponds to the adjustment of the movable electrode carrying frame J to the right. To adjust the frame I to the left, the left-hand bolts I8 and I11 are backed off and the right-hand bolts I8 and I11 are set up. This corresponds to the adjustment of frame J to the left.

When the lower electrode carrying frames are shifted to the right or left as above described, the stay wire holders D and transfer fingers D10 of the lower bank must also be correspondingly shifted. In the case of the transfer fingers, this is accomplished by sliding the shaft D18 which carries them to the right or left the required amount, one of the end bearings for this shaft being in the form of a releasable clamp to permit of this adjustment. In the case of the stay wire holders D, the adjustment is effected by lateral adjustment of the girt F12 of which the holder support bar D2 is a part, the girt being arranged for lateral adjustment and being provided with a tongue T received in a corresponding recess in the frame J so that girt F12 and frame J move together as a unit during adjustment.

In making the fabric shown in Fig. 2 there remain, after the stay wires 2 and 5 have been welded to the strand wires, unwelded crossings 7, 7 at the edges of the fabric. Means for welding these crossings are two welding units K, K, Figs. 3 and 5, one mounted on each side on the main frame above the devices for welding the upper stay wires. As these edge crossing welding units are duplicates of one another, it will suffice to describe one of them, Fig. 5. The unit K is secured to a cross girt F22 at the top of the frame F. It contains a transformer having a secondary conductor K1 leading to a stationary electrode K2, back of which the edge strand wire passes. The other terminal of the transformer is connected by a flexible conductor K3 to a movable electrode K4. The conductor K3 lies outside of the edge of the fabric and is of the same construction and arrangement as the conductor H7, Figs. 15 and 16. The electrode K4 is secured to and insulated from one arm K5 of a member loosely mounted on a shaft K6 and having an upright arm K7. Fast on the shaft K6 is an arm K8 between which and K7 is a spring K9. When the shaft K6 is rocked, the electrode K4 is yieldingly pressed against the crossing of the stay wire and the edge strand wire and the stationary electrode K2.

Means for rocking the shaft K6 consist of a lever K10 fast on that shaft and pivotally connected at its lower end by a link K11 to the rod J2 which moves the frame J carrying the upper set of movable electrodes. There is another device K at the other edge of the fabric which is mounted and operated in the same manner to weld the unwelded edge crossings of the wires at that edge.

As pointed out in connection with Fig. 2, the welded fabric may be split along the line 20. On each side of this line 20 are alternate unwelded crossings 7, 7. To weld these crossings, which are adjacent to the middle of the machine, an electric welding device L, Figs. 3 and 17, is mounted on the upper girt F20 of the machine and is adjustable lengthwise thereof. One terminal of the secondary of the transformer in this device, Fig. 17, is connected to an electrode L1, and the other terminal is connected to an electrode L2. One of these electrodes is above the other by a distance equal to the distance between two stay wires and is set off to one side of the other by a distance equal to the distance between two strand wires. On the shaft K6 are similar levers etc. as in the case of the edge welding device K above described, except that the arm L5, corresponding to the arm K5, has pivoted to it a conductor L3, the ends of which meet the electrodes L1 and L2 respectively, when the shaft K6 is rocked, to weld wires at two crossings 7 and 7 simultaneously, Fig. 2.

At the back of the machine there is a splitter M, Fig. 4, for splitting the welded fabric when it is desired to produce two pieces of fabric at the same time. This splitter, Figs. 18 and 19, is provided with a stationary base or bed M1 on which are mounted two cutters M2, M2, adjustably secured to it by bolts. The welded fabric is fed and lies just over these cutters. Pivoted at M3 on the base M1 is a lever M4 which has a depending arm M5 and an upwardly projecting arm M6 to which is fastened a blade M7. When the blade M7 is rocked downwards it cuts short pieces out of two stay wires 2 during a dwell of the welded fabric. The length of the cut out portions of the stay wires is long enough to provide a gap or slot between the two pieces of fabric up through which the arm M6 of the splitter extends.

The lower arm M5 is pivoted to a rod M6, Fig. 4, the other end of which is pivoted to an arm M7 fast on a shaft M8 which is rocked so as to operate the splitter M7. The splitting mechanism is adjustably mounted as a unit on a cross girt of the main frame F19 (Fig. 4) so that the fabric may be split at the desired distance between the edges. The shaft M8 is rocked by an arm M9 fast on the shaft, Fig. 20. Arm M9 is connected by a pivoted link M10 to a stud M11 on a disk M12 fast on the end of main shaft A.

Carried on the arm M7 of the splitter is a fabric positioning device N, which is pivoted at N1 to M7 and has pivoted to its upper end a rod N2 which passes through a lug N3 secured to M7. The rod N2 is held in central position by springs N4 between nuts on the rod and the lug N3. The positioner N has a beveled end N6 which, when the blade M7 begins to descend, is forced against a strand wire of the welded fabric and, if the fabric is out of place, it adjusts the fabric laterally accurately to a predetermined position, thereby insuring that the splitter will split the fabric evenly between two adjacent strand wires.

Mounted on the main frame, rearwardly of the splitting station at the back of the machine, are devices P, Fig. 4, for trimming the ends of the stay wires 2 which project beyond the edge strand wires, and, in the case of a split fabric, for trimming off the inner projecting ends of the stay wires, where the fabric has been split. As the trimmers are substantially alike, it will suffice to describe one of them.

Each trimmer, Figs. 21 and 22, comprises a base member P1 fixed to a girt member F40 or F40' of the main frame beyond and below the edge of the fabric to be trimmed by the device. Upon this base member P1 is pivoted, on a pivot pin P2 parallel to the strand wires, the lower end of a bracket P3, said bracket being held in inwardly inclined position toward the edge of the fabric by the action of a pair of coil springs P4 and P5 bearing against opposite sides of the bracket. The lower spring P5 surrounds the outer shank of a bolt P6 which projects from an inwardly extending arm P7 on member P1 and is loosely received through a collar P8 in the bracket, the spring being adjustably compressed against the outer side of the collar P8 by a nut P9 threaded on the bolt P6. The upper one of the springs, P4, is fixed at one end to a bolt P10 threaded through the arm P7, and seats at the other end in a recess in the inner side of bracket P3. The bracket is thus resiliently held by the opposite pressure of springs P4 and P5 at a predetermined inclination to the plane of the fabric, said inclination being adjustable by adjustment of the bolt P10 and the nut P9.

Fixed to the bracket P3 is a supporting table P11 projecting inwardly of the edge of the fabric and arranged to receive and support the edge portion of the fabric thereon. Fixed to the outer side of said table and forming a continuation thereof is an anvil P12 comprising a specially hardened steel strip which receives and supports on its upper end the edge strand wire of the fabric.

Slidably mounted in a pair of guides P13 fixed to the bracket P3 is an arm P14 which projects upwardly above and beside the edge of the fabric forwardly of the anvil P12 and has fixed to its upper end a rearwardly extending cross arm P15 which has fixed to its outer side, rearwardly of the arm P14, a pair of downwardly projecting cutters P16 and P17 and, rearwardly of said cutters, a bracket P18 carrying a downwardly projecting pin P19. Each of the cutters P16, P17 has a downwardly inclined cutting edge P20. At either end of the cutting edges P20 of the cutters P17 and P16 there is provided a downwardly projecting bevel pin P21. Cutters P16 and P17 are so located on the cross arm P15 that, when arm P14 is drawn downwardly in the guides P13, their cutting edges P20 will just clear the side edge of the anvil P12, and the pins P21 will pass downwardly between successive projecting ends of the stay wires with their inner surfaces just clearing the side of the anvil. The pin P19 is offset inwardly from the cutting edges P20 and the pins P21 and it is arranged to pass through the fabric in front of the anvil between the edge strand wire and the next successive strand wire and between a pair of successive stay wires.

Upon the inner side of the cross arm P15 there is slidably mounted on a guide pin P22 a presser foot P23 having at its upper end a pin P24 loosely received in a lug P25 on the upper end of the bracket P18. The presser foot is urged downwardly by a coil spring P26 surrounding the pin P24 and bearing at one end against the lug P25 and at the opposite end against the presser foot. Presser foot P23 is so located as to yieldably press the fabric on the table P11, as the cutter is drawn down to sever the projecting ends of the stay wires.

The cutters are operated from the shaft M8 by means of a link P27 connected at one end to an arm fixed to said shaft and at the other end to an arm P29 fixed to a stub shaft P30 rotatably journaled through the bracket P3. The shaft P30 has fixed thereto an arm P31 pivotally connected to a short link P32 which is pivoted to the lower portion of the arm P14.

By means of these connections, the rocking of shaft M8 in turn rocks the stub shaft P30, which, through arm P31 and link P32, draws the arm P14 downwardly in the guides P13 from the position shown in Figs. 21 and 22, causing the pins P21 to pass downwardly between the projecting ends of a pair of stay wires overlying the anvil P12.

If the edge strand wire is positioned beyond the outer edge of the anvil P12, the beveled inner sides of these pins P21 will engage it and either push it back on to the anvil to the position shown in Fig. 22, or cause the bracket P3 and associated parts to rock outwardly upon the pivot pin P2 against the action of spring P5 so that the anvil is moved to the position of Fig. 22 with respect to the edge strand wire. Further downward movement of the arm P14 causes the pin P19 to pass through the fabric and if the edge strand wire is disposed inwardly of its position of Fig. 22, the beveled end of said pin will engage it with the reverse effect of that just described in connection with the pins P21. Accordingly, it will be seen that the pins P19 and P21 form a highly accurate centering device, cooperating with the resiliently pivoted mounting of the bracket P3, to position the edge strand wire uniformly at the extreme outer edge of the anvil during each cutting operation.

As the arm P14 continues downwardly the inner end of each cutting edge P20 engages the projecting end of a pair of successive stay wires located beneath it and shears it off, while the presser foot P23 resiliently presses the fabric on the table P11 and prevents buckling. The parts are then returned to the position shown in Figs. 21 and 22.

By reason of the inclination of the bracket P3 and associated parts to the plane of the fabric, the cut produced by the cutting edges P20 is sloped or beveled outwardly from the upper to the lower surface of the stay wire, and, by reason of the accurate location of the edge strand wire at the extreme outer edge of the anvil, this beveled cut is substantially at a tangent to the portion of the outer surface of the edge strand wire which has been embedded, by the previous welding, into the stay wire, as can best be seen in Fig. 23 wherein the beveled end of the stay wire 2, after completion of this cut, removing the end of the stay wire which projected beyond the edge strand wire 1, is shown at 30. This beveled cut is highly advantageous in that it produces a neat, smooth edge on the fabric which is free from projecting irregularities to catch in the hands or clothing.

The trimmer operating mechanism is timed to complete its cycle of movement through the plane of the fabric to trim off the ends of a pair of successive stay wires during a dwell of the strand wire feeding mechanism. In the ensuing operation of the strand wire advancing mechanism, which, as previously described, advances the fabric a distance equal to twice the space between successive stay wires, the next pair of successive stay wires is brought to cutting position over the anvil, the trimmer being then in elevated position so that the pins P19 and P21 are clear of the fabric, other than the foremost pin P21, which is beyond the point of trimming of the stay wire ends and therefore can be made longer than the others to project permanently through the plane of said ends. The trimmer is then again operated, and so on.

As indicated in Fig. 4, one of the two devices P for trimming the inner projecting stay wire ends at opposite sides of an internal split of the fabric is located on girt F40' in advance of the girt F40 which carries the other three trimmers, thus avoiding interference between the two inner edge trimmers. Each of these inner edge trimmers has its arm P14 projecting through the fabric in the space provided by the removal of stay wire ends by its cutters.

After leaving the rearmost trimmers P the finished fabric passes between a pair of guide rolls Q and is rolled up on a roller R received optionally in two spaced sets of bearings R1 and R2 on the main frame, the roller being operated unidirectionally with the fabric advancing mechanism by means of a belt and pulley connection (not shown) to the shaft A8. Roller R is provided with a ratchet R3 cooperating with suitable pawls (not shown) on the frame to prevent reverse rotation of the roller under the pull of the fabric.

The transformers of my machine may be of any suitable construction for delivering the welding current of proper voltage and amperages to the electrodes. Their construction is not a part of my invention. Likewise the electric connections for energizing and deenergizing the transformers are not part of my invention and may be of any suitable construction. I prefer, however, that the circuits through the primaries of the transformers be closed by a switch, operated from a shaft of the machine, after the electrodes have pressed the stay wires against the strand wires, and I also prefer to include in the circuits to the transformer primaries an automatic timer or circuit interrupting device of the synchronous type, such as the Thyratron or Ignitron, to break the circuit after a predetermined current flow.

Having now shown and described preferred embodiments of the invention, what I desire to claim and secure by Letters Patent is:

1. In a wire fabric electric welding machine adapted to make a welded fabric in which the stay wires and the strand wires make meshes of predetermined dimensions, the combination of a main frame, means for intermittently feeding the strand wires and the fabric longitudinally through the machine between dwells a distance equal to the sum of the lengths of two successive meshes, two sets of devices each mounted on the frame and including means for feeding a stay wire across the strand wires, means for cutting off a length of the fed-in stay wire and electric welding units spaced across the machine, the second set of said devices being so positioned on the frame with relation to the first set that the wire fed in by the second set is fed in between adjacent welded wires of the first set, and means to operate said two sets of devices to weld each of the lengths of fed-in stay wires to strand wires during the dwell of the intermittent feed of the strand wires whereby the stay wires of each set are welded to the strand wires at crossings which are spaced apart longitudinally a distance equal to the sum of the lengths of two successive meshes and in one cycle two stay wires are fed in and welded to strand wires and the fabric is advanced a distance equal to the sum of the lengths of two successive meshes.

2. In a wire fabric electric welding machine adapted to make a welded fabric in which the stay wires and the strand wires make meshes of predetermined dimensions, the combination of a main frame, adjustable means for intermittently feeding the strand wires and the fabric longitudinally through the machine between dwells a distance equal to the sum of the lengths of two successive meshes, two sets of devices each mounted on the frame and including means for feeding a stay wire across the strand wires, means for cutting off a length of the fed-in stay wire and electric welding units spaced across the machine, the second set of said devices being so positioned on the frame with relation to the first set that the wire fed in by the second set is fed in between welded wires of the first set, means to operate said two sets of devices to weld each of the lengths of fed-in stay wires to strand wires during the dwell of the intermittent feed of the strand wires and means to adjust the position of one of said sets of devices longitudinally with relation to the other set whereby the lengths of the meshes are adjustable with the stay wires of one set welded in between adjacent wires of the other set.

3. In a wire fabric electric welding machine adapted to make a welded fabric in which the stay wires and the strand wires may make meshes of predetermined different dimensions, the combination of a main frame, means for intermittently feeding the strand wires and the fabric longitudinally through the machine between dwells a distance greater than the length of the meshes, two sets of devices each mounted on the frame and including means for feeding a stay wire across the strand wires, means for cutting off a length of the fed-in stay wire and electric welding units spaced across the machine, the second set of said devices being so positioned on the frame with relation to the first set that the wire fed in by the second set is fed in between welded wires of the first set, means to operate said two sets of devices to weld each of the lengths of fed-in stay wires to strand wires during the dwell of the intermittent feed of the strand wires and means to adjust the position of one of said sets of devices laterally with relation to the other set whereby the stay wires may be welded to the strand wires at every crossing or the stay wires of one set may be welded only to alternate strand wires to which stay wires of the other set are not welded.

4. In a wire fabric electric welding machine which is adapted to make either a welded fabric in which the stay wires are welded to the strand wires at every crossing or a welded fabric in which each stay wire is welded to the strand wires at every other crossing and alternate stay wires are welded only to alternate strand wires, the combination of a main frame, means for intermittently feeding the strand wires and the fabric longitudinally through the machine, including devices by which a variable number of strand wires may be so fed, means to adjust the length of strand wires fed at each intermittent feed, one set of devices mounted on the frame including means for feeding a stay wire across the strand wires, means for cutting off a length of the fed-in stay wire and electric welding units spaced across the machine, an auxiliary frame, a second set of devices mounted on said auxiliary frame and including means for feeding a stay wire across the strand wires, means for cutting off a length of the fed-in stay wire and electrical welding units spaced across the machine, and means for mounting said auxiliary frame on the main frame and adjusting and fixing its position so that the electric welding units thereof may weld the fed-in stay wires to either the same strand wires to which the stay wires of the first-named set of devices are welded or to alternate strand wires to which the stay wires of said first-named set of devices are not welded.

5. In a wire fabric electric welding machine adapted to make a welded fabric in which the stay wires and the strand wires may make meshes of predetermined different dimensions, the combination of a main frame, means for intermittently feeding the strand wires and the fabric longitudinally through the machine between dwells a distance greater than the length of the meshes, two sets of devices each mounted on the frame and including means for feeding a stay wire across the strand wires, means for cutting off a length of the fed-in stay wire and electric welding units spaced across the machine, the second set of said devices being so positioned on the frame with relation to the first set that the wire fed in by the second set is fed in between welded wires of the first set, means to operate said two sets of devices to weld each of the lengths of fed-in stay wires to strand wires during the dwell of the intermittent feed of the strand wires, means to adjust the position of one of said sets of devices longitudinally with relation to the other set and means to adjust the position of one of said sets of devices laterally with relation to the other set whereby the lengths and widths of the meshes may be varied and the stay wires may be welded to the strand wires at every crossing or the stay wires of one set may be welded only to alternate strand wires to which stay wires of the other set are not welded.

6. In a wire fabric electric welding machine adapted to make a welded fabric in which the stay wires and the strand wires make meshes of predetermined dimensions and each mesh, except those at the edges of the fabric, has only two welded crossings, such being at diagonal corners of the mesh, and each mesh at an edge of the fabric has three welded crossings including two welded crossings with the edge strand wire, the combination of a main frame, means for intermittently and concurrently feeding two sets of strand wires, the wires of one set alternating with the wires of the other set, and the fabric longitudinally through the machine between dwells a distance equal to the sum of the lengths of two successive meshes, two sets of devices each mounted on the frame and including means for feeding a stay wire across the strand wires, means for cutting off a length of the fed-in stay wire and electric welding units spaced across the machine, the second set of said devices being so positioned on the frame with relation to the first set that the wire fed in by the second set is fed in between welded wires of the first set and the units of one set being positioned to weld the crossings of one set of stay wires to one set of strand wires and the units of the other set being positioned to weld the crossings of the other set of stay wires to the other set of strand wires, a welding unit mounted on the frame and spaced from said second set of devices and aligned with an edge strand wire, and means to operate said two sets of devices and said last-named welding unit to weld during the dwell of the intermittent feed one length of fed-in stay wire to one set of strand wires and the other length of fed-in stay wire to the other set of strand wires and the edge strand wire to a previously welded stay wire to which said edge strand wire had not been welded.

7. In a wire fabric electric welding machine adapted to make a welded fabric in which the stay wires and the strand wires make meshes of predetermined dimensions and each mesh, except those at the edges of the fabric, has only two welded crossings, such being at diagonal corners of the mesh, and each mesh at each edge of the fabric has three welded crossings including two welded crossings with the edge strand wire, the combination of a main frame, means for intermittently and concurrently feeding two sets of strand wires, the wires of one set alternating with the wires of the other set, and the fabric longitudinally through the machine between dwells a distance equal to the sum of the lengths of two successive meshes, two sets of devices each mounted on the frame and including means for feeding a stay wire across the strand wires, means for cutting off a length of the fed-in stay wire and electric welding units spaced across the machine, the second set of said devices being so positioned on the frame with relation to the first set that the wire fed in by the second set is fed in between welded wires of the first set and the units of one set being positioned to weld the crossings of one set of stay wires to one set of strand wires and the units of the other set being positioned to weld the crossings of the other set of stay wires to the other set of strand wires, two edge welding units mounted on the frame and spaced longitudinally from said second set of devices and from one another, one edge welding unit being aligned with each edge strand wire, and means to operate said two sets of devices and said edge welding units to weld during the dwell of the intermittent feed one length of a fed-in stay wire to one set of strand wires and the other length of a fed-in stay wire to the other set of strand wires and each edge strand wire to each stay wire.

8. In a wire fabric electric welding machine adapted to make two welded fabrics in each of which the stay wires and the strand wires make meshes of predetermined dimensions and each mesh, except those at the edges of the fabrics, has only two welded crossings, such being at diagonal corners of the mesh, and each mesh at each edge of the fabrics has three crossings including two welded crossings with the edge strand wire, the combination of a main frame, means for intermittently and concurrently feeding two sets of strand wires, the wires of one set alternating with the wires of the other set, and the fabric longitudinally through the machine between dwells a distance equal to the sum of the lengths of two successive meshes, two sets of devices each mounted on the frame and including means for feeding a stay wire across the strand wires, means for cutting off a length of the fed-in stay wire and electric welding units spaced across the machine, the second set of said devices being so positioned on the frame with relation to the first set that the wire fed in by the second set is fed in between welded wires of the first set and the units of one set being positioned to weld the crossings of one set of stay wires to one set of strand wires and the units of the other set being positioned to weld the crossings of the other set of stay wires to the other set of strand wires, two edge welding units and two centrally located welding units mounted on the frame and spaced longitudinally from said second set of devices, one edge welding unit being aligned with each edge strand wire and said centrally located welding units being laterally so positioned that each is aligned with one of two centrally located and adjacent strand wires, and means to operate said two sets of devices and said edge welding units and said centrally located welding units during the dwell of the intermittent feed to weld one length of a fed-in stay wire to one set of strand wires and to weld the other length of a fed-in stay wire to the other set of strand wires and to weld each edge strand wire to the stay wire to which said edge strand wire had not been welded and to weld each of said centrally located strand wires to the length of stay wire to which said strand wire had not been welded, and means to split the welded fabric into two fabrics by cutting the stay wires between the said centrally located strand wires.

9. In a machine for making welded wire fabric which includes a main frame, strand wire feeding means for intermittently feeding the longitudinal strand wires of the fabric and the fabric itself longitudinally through the machine, and means mounted on the main frame for applying a first set of stay wires to the strand wires, including means to feed a stay wire across the strand wires, to cut off a length of said stay wire, to carry said length of stay wire close to the strand wires and to weld said length of stay wire to at least some of the strand wires during a dwell of the strand wire feeding means, the combination of means mounted on the main frame for applying a second set of stay wires to the strand wires, including means to feed in a stay wire across the strand wires, to cut off a length of said stay wire, to carry said length of stay wire close to the strand wires and to weld said length of stay wire to at least some of the strand wires during a dwell of the strand wire feeding means, means for adjustably positioning one of said stay wire applying means longitudinally of the strand wires relative to the other said stay wire applying means, means for adjustably positioning the welding means of one of said stay wire applying means laterally of the strand wires relative to the welding means of the other said stay wire applying means, auxiliary welding means mounted on the frame beyond said second named stay wire applying means for welding crossings, unwelded by said stay wire applying means, of the stay wires with the edge strand wires and with an intermediate pair of next adjacent strand wires, means mounted on the frame beyond said auxiliary welding means for splitting the fabric by severing the stay wires between said intermediate pair of strand wires and for trimming the split portions of the fabric by cutting off the stay wire ends projecting beyond the edge strand wires thereof, and means for operating said wire applying means, said auxiliary welding means and said splitting and trimming means during the same dwells of the strand wire feeding means.

10. In a wire fabric electric welding machine, the combination of a main frame, means for intermittently feeding the strand wires and the fabric longitudinally through the machine, means mounted on the frame for feeding a stay wire across and adjacent to the strand wires including devices to receive and releasably hold a length of stay wire and pairs of guides mounted on said frame and so positioned as to receive between the members of each pair the fed-in stay wire, said members being so related as to form between the adjacent surfaces of the members of each pair a slot for guiding the cut-off length of stay wire to a position adjacent the strand wires, means for cutting off a length of the fed-in stay wire, means to engage the cut-off length of stay wire and carry it through said slots, and electric welding units spaced across the machine to weld the length of fed-in stay wire to the strand wires during the dwell of the intermittent feed.

11. In a wire fabric electric welding machine, the combination of a main frame, means for intermittently feeding the strand wires and the fabric longitudinally through the machine, means mounted on the frame for feeding a stay wire across and adjacent to the strand wires including devices to receive and releasably hold a length of stay wire and pairs of guides mounted on said frame and so positioned as to receive between the members of each pair the fed-in stay wire, one of said members being pivoted to the other so as to form between the adjacent surfaces of the members of each pair a slot for guiding the cut-off length of stay wire to a position adjacent the strand wires, means for cutting off a length of the fed-in stay wire, means to engage the cut-off length of stay wire and carry it through said slots, and electric welding units spaced across the machine to weld the length of fed-in stay wire to the strand wires during the dwell of the intermittent feed.

12. In a machine for making welded wire fabric of longitudinal strand wires and crossing stay wires welded to at least some of the strand wires, the combination, with means for advancing the formed fabric longitudinally of the strand wires, of means for severing the stay wires between an adjacent pair of the strand wires to sub-divide the fabric, said last named means comprising opposed cutter blades located on opposite sides of the fabric between said pair of strand wires, one of said blades being movable toward and from the other to sever therebetween the portion of a stay wire between said pair of strand wires, a centering pin fixedly connected to said movable cutter blade and arranged to be projected into a mesh of the formed fabric, by cutting movement of said cutting blade, to adjust the position of said pair of strand wires laterally relative to said blade, and means for operating said movable blade in timed relation to said advancing means to sever said portion of each stay wire against said other blade when said portion arrives at a cutting position between said blades.

13. In a machine for making welded wire fabric of longitudinal strand wires and crossing stay wires welded to at least some of the strand wires, the combination, with means for advancing the formed fabric longitudinally of the strand wires, of means for severing the stay wires between an adjacent pair of the strand wires to sub-divide the fabric, said last named means comprising a pair of cutter jaws arranged at opposite sides of the fabric, one of said jaws presenting a pair of laterally spaced cutting edges to the fabric between said pair of strand wires, the other of said jaws having a cutter blade arranged opposite the space between the cutting edges of said first named jaw, one of said jaws being movable toward and from the other said jaw to sever from a stay wire the portion thereof, between said pair of strand wires, which lies between said pair of cutting edges of said first named jaw, and means for operating said movable jaw in timed relation to said advancing means to remove said portion of each stay wire when said portion arrives in cutting position between said blades, said last named means including an operating arm for said movable jaw projecting through the plane of the advancing fabric, rearwardly of said cutting edges, in the gap between the cut ends of stay wires previously severed by said jaws.

14. In a machine for making welded wire fabric of longitudinal strand wires and crossing stay wires welded to the strand wires, the combination, with means for advancing the formed fabric longitudinally of the strand wires, of means for trimming off the ends of the stay wires projecting beyond an edge strand wire of the formed fabric comprising a cutter blade movably mounted opposite one surface of the fabric, an anvil located at the opposite side of the fabric and arranged to support said side edge of the fabric thereon, and means for operating said cutter blade, on arrival in a trimming position on said anvil of a crossing of a stay wire with said edge strand wire, to shear off the end of said stay wire projecting beyond said strand wire by moving the cutting edge of said blade toward the anvil along a slanting path which is substantially a tangent to the outer side surface of said edge strand wire at the outermost point of contact thereof with said stay wire, thereby producing on the trimmed end of said stay wire a beveled surface having its outermost extremity substantially flush with said outer side surface of said edge strand wire.

15. In a machine for making welded wire fabric of longitudinal strand wires and crossing stay wires welded to the strand wires, the combination, with means for advancing the formed fabric longitudinally of the strand wires, of means for trimming off the ends of the stay wires projecting beyond an edge strand wire of the formed fabric comprising a cutter blade movably mounted opposite one surface of the fabric, an anvil located at the opposite side of the fabric and arranged to support said side edge of the fabric thereon, and means for operating said cutter blade, on arrival in a trimming position on said anvil of a crossing of a stay wire with said edge strand wire, to shear off the end of said stay wire projecting beyond said strand wire by moving the cutting edge of said blade toward the anvil along a slanting path which is substantially a tangent to the outer side surface of said edge strand wire at the outermost point of contact thereof with said stay wire, thereby producing on the trimmed end of said stay wire a beveled surface having its outermost extremity substantially flush with said outer side surface of said edge strand wire, said last named means comprising a supporting arm for said cutter blade, means mounting said arm for sliding movements beyond said edge strand wire in a plane substantially parallel to said slanting path of cutting movement of the cutting edge of said blade, and means for sliding said arm in timed relation to the advance of the fabric by said advancing means.

16. In a machine for making welded wire fabric of longitudinal strand wires and crossing stay wires welded to the strand wires, the combination, with means for advancing the formed fabric longitudinally of the strand wires, of means for trimming off the ends of the stay wires projecting beyond an edge strand wire of the formed fabric comprising a cutter blade, an arm supporting said cutter blade opposite one surface of the fabric, means slidably mounting said arm for reciprocal sliding movements in a plane transverse to the plane of the fabric to move said cutter blade to and from the plane of the fabric, means for adjustably positioning said arm and mounting means at an incline to the plane of the fabric, and means for reciprocating said arm in said slide in timed relation to the advancing movement of said fabric by said advancing means.

17. In a machine for making welded wire fabric of longitudinal strand wires and crossing stay wires welded to the strand wires, the combination, with means for advancing the formed fabric longitudinally of the strand wires, of means for trimming off the ends of the stay wires projecting beyond an edge strand wire of the formed fabric comprising a cutter blade, an arm supporting said cutter blade opposite one surface of the fabric, means slidably mounting said arm for reciprocal sliding movements in a plane transverse to the plane of the fabric to move said cutter blade to and from the plane of the fabric, means for adjustably positioning said arm and mounting means at an incline to the plane of the fabric, pin means connected to said arm and arranged to engage opposite sides of said edge strand wire on sliding of said arm to move said cutter blade toward the plane of the fabric whereby to adjust the relative positions of said strand wire and cutter blade to a predetermined cutting relation, and means for reciprocating said arm in said slide in timed relation to the advancing movement of said fabric by said advancing means.

WILLIAM SAYLES SOUTHWICK.